(12) United States Patent
Hong et al.

(10) Patent No.: US 10,947,113 B2
(45) Date of Patent: Mar. 16, 2021

(54) GRAPHENE FIBER, METHOD FOR MANUFACTURING SAME AND USE THEREOF

(75) Inventors: Byung Hee Hong, Seoul (KR); Keun Soo Kim, Seoul (KR); Hyeong Keun Kim, Hwaseong-si (KR); Su Kang Bae, Suwon-si (KR)

(73) Assignee: GRAPHENE SQUARE INC., Suwon-si (KR)

( * ) Notice: Subject to any disclaimer, the term of this patent is extended or adjusted under 35 U.S.C. 154(b) by 1451 days.

(21) Appl. No.: 13/569,361

(22) Filed: Aug. 8, 2012

(65) Prior Publication Data

US 2012/0298396 A1    Nov. 29, 2012

Related U.S. Application Data

(63) Continuation of application No. PCT/KR2011/000850, filed on Feb. 9, 2011.

(30) Foreign Application Priority Data

Feb. 9, 2010 (KR) ................. 10-2010-0012084

(51) Int. Cl.
*D01F 9/127* (2006.01)
*C23F 1/14* (2006.01)
*H01B 3/00* (2006.01)
*H01B 3/30* (2006.01)
*B82Y 40/00* (2011.01)
*B82Y 30/00* (2011.01)
*H01B 1/04* (2006.01)
(Continued)

(52) U.S. Cl.
CPC .............. *B82Y 40/00* (2013.01); *B82Y 30/00* (2013.01); *C01B 32/184* (2017.08); *C01B 32/194* (2017.08); *D01F 9/127* (2013.01);

*H01B 1/04* (2013.01); *Y10T 29/49123* (2015.01); *Y10T 428/292* (2015.01); *Y10T 428/2918* (2015.01)

(58) Field of Classification Search
CPC .......... H01B 7/18; H01B 11/804; H01B 1/24; D01F 9/127; C23F 1/14
See application file for complete search history.

(56) References Cited

U.S. PATENT DOCUMENTS

2002/0136882 A1    9/2002  Yanagisawa et al.
2004/0041130 A1 *  3/2004  Yamamoto ............. B82Y 30/00
                                                                252/500
(Continued)

FOREIGN PATENT DOCUMENTS

EP     2 392 700 A1    12/2011
JP      2009179915       8/2009
(Continued)

OTHER PUBLICATIONS

Definition of PLANAR by Merriam-Webster Dictionary (Year: 2020).*

(Continued)

*Primary Examiner* — Jennifer A Boyd
*Assistant Examiner* — Ricardo E Lopez
(74) *Attorney, Agent, or Firm* — Greer Burns & Crain Ltd.

(57) ABSTRACT

The present disclosure relates to a manufacturing method of a graphene fiber, a graphene fiber manufactured by the same method, and use thereof. The graphene fiber formed by using graphenes of linear pattern can be applied to various fields such as an electric wire and coaxial cable.

19 Claims, 9 Drawing Sheets

(51) Int. Cl.
*C01B 32/194* (2017.01)
*C01B 32/184* (2017.01)

(56) References Cited

U.S. PATENT DOCUMENTS

| | | |
|---|---|---|
| 2006/0062715 A1 | 3/2006 | Endo et al. |
| 2007/0158618 A1 | 7/2007 | Song et al. |
| 2008/0035367 A1* | 2/2008 | Tanaka ............... H01B 11/1804 174/102 R |
| 2008/0061477 A1* | 3/2008 | Capizzo ................ H01J 9/025 264/402 |
| 2009/0068471 A1* | 3/2009 | Choi ...................... B82Y 30/00 428/408 |
| 2009/0246521 A1 | 10/2009 | Swift et al. |
| 2009/0255706 A1* | 10/2009 | Jiang ....................... H01B 1/24 174/102 R |

FOREIGN PATENT DOCUMENTS

| | | |
|---|---|---|
| JP | 2009184910 | 8/2009 |
| WO | WO 01/75902 A1 | 10/2001 |
| WO | WO 2009/129194 A2 | 10/2009 |

OTHER PUBLICATIONS

Japanese Office Action—Japanese Application No. 2012-552801 dated Oct. 24, 2013, citing JP2009-179915A and JP2009-184910A.
European Search Report issued in counterpart EP App. No. 11 742 453.1, dated Nov. 27, 2015.
International Search Report—PCT/KR2011/000850 dated Oct. 4, 2011.
European Search Report issued in counterpart EP App. No. 11 742 453.1, dated Jul. 1, 2015.
Database WPI Week 200956, Jan. 1, 2009, Thomson Scientific, AN 2009-M45381. XP002740888.
Kai Zhang et al., "Graphene/Polyaniline Nanofiber Composites as Supercapacitor Electrodes", Chemistry of Materials, vol. 22, No. 4, Jan. 27, 2010, pp. 1392-1401.
EP Search Report issued in counterpart EP Application No. 18 160 382.0, dated May 9, 2018.

* cited by examiner

GRAPHENE FIBER, METHOD FOR MANUFACTURING SAME AND USE THEREOF

CROSS-REFERENCE TO RELATED APPLICATION

This application is a Continuation of International Application No. PCT/KR2011/000850 filed Feb. 9, 2011, which claims the benefits of Korean Patent Application No. 10-2010-0012084 filed Feb. 9, 2010. The entire disclosure of the prior application is incorporated herein by reference in its entirety.

TECHNICAL FIELD

The present disclosure relates to a manufacturing method of a graphene fiber, a graphene fiber manufactured by the same method, and use thereof. The graphene fiber formed by using graphenes of linear pattern can be applied to various fields such as an electric wire and coaxial cable.

BACKGROUND ART

As a low dimensional nano-material composed entirely of carbon, there are a fullerene, a carbon nanotube, a graphene, graphite, and the likes. That is, a zero-dimensional fullerene is formed in a ball of linked hexagonal rings composed of carbon atoms; a carbon nanotube is rolled in a one-dimensional form of the linked hexagonal rings; a graphene is formed in a two-dimensional one-atom-thick planar sheet; and graphite is formed in a three-dimensional graphene sheets stacked together. The graphene is structurally and chemically stable, and also, the graphene is an excellent conductor having high conductivity due to its structure of a one-atom-thick planar sheet having relatively less surface defects. By way of example, the graphene moves electrons about 100 times faster than silicon, and theoretically, the graphene can carry about 100 times the density of electric current as copper.

Due to such excellent electrical properties, the graphene has attracted wide attention as a substitute material for a metallic wire. Conventionally, copper wires have been mainly used. Recently, the amount of copper wire used has been sharply increased due to rapid economic growth in developing countries including China and building an information-communications infrastructure all over the world, resulting in an increase in copper price. Further, due to the increase in the amount of copper wire used, the world's copper reserves are predicted to be exhausted in the next 25 to 60 years. Therefore, recently, a lot of research on a substitute material for a metallic wire such as graphene has been carried out.

DISCLOSURE OF THE INVENTION

Problems to be Solved by the Invention

In view of the foregoing, the present disclosure provides a method of manufacturing a graphene fiber by forming a linear graphene by a chemical vapor deposition method and using the formed linear graphene. Further, the present disclosure provides a graphene electric wire or coaxial cable containing the graphene fiber manufactured by the above-described method and having an excellent electrical property.

However, the problems to be solved by the present disclosure are not limited to the above description and other problems can be clearly understood by those skilled in the art from the following description.

Means for Solving the Problems

In accordance with a first aspect of the present disclosure, there is provided a manufacturing method of a graphene fiber, including: forming a metal layer containing multiple linear patterns on a substrate; supplying a reaction gas containing a carbon source and heat to the metal layer containing multiple linear patterns to form graphenes of linear pattern; immersing the substrate in an etching solution to selectively remove the metal layer containing multiple linear patterns for separating the graphenes of linear pattern from the substrate and dispersing multiple linear graphenes into the etching solution; and pulling the dispersed multiple linear graphenes out of the etching solution to form a graphene fiber.

In accordance with another aspect of the present disclosure, there is provided a graphene fiber formed by connecting multiple linear graphenes manufactured by the above-described method.

In accordance with still another aspect of the present disclosure, there is provided a graphene electric wire, including a graphene fiber of claim 10, and an insulator wrapping around the graphene fiber.

In accordance with still another aspect of the present disclosure, there is provided a coaxial cable, including: a core conductor including a graphene; an insulator wrapping around the core conductor; an external conductor wrapping around the insulator; and a jacket wrapping around the external conductor.

Effect of the Invention

In accordance with the present disclosure, a linear graphene is formed by a chemical vapor deposition method and a graphene fiber is manufactured by using the formed linear graphene, and, thus, a high quality graphene fiber can be manufactured at low cost. Further, the graphene fiber manufactured by a method in accordance with the present disclosure is very flexible and light as compared with a metallic wire and has high electrical conductivity and thermal conductivity, and, thus, a wire or coaxial cable using the graphene fiber maximizes electric power transmission efficiency and an electric power transmission capacity by minimizing power loss caused by heat generation and has high signal transmission efficiency at a high frequency.

BEST MODE FOR CARRYING OUT THE INVENTION

Hereinafter, illustrative embodiments and examples will be described in detail so that inventive concept may be readily implemented by those skilled in the art.

However, it is to be noted that the present disclosure is not limited to the illustrative embodiments and examples but can be realized in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "band" means an object which is narrow in width and long in length.

A graphene fiber manufacturing method in accordance with an aspect of the present disclosure includes: forming a metal layer containing multiple linear patterns on a substrate; supplying a reaction gas containing a carbon source and heat to the metal layer containing multiple linear patterns to form graphenes of linear pattern; immersing the substrate in an etching solution to selectively remove the metal layer containing multiple linear patterns for separating the graphenes of linear pattern from the substrate and dispersing multiple linear graphenes into the etching solution; and pulling the dispersed multiple linear graphenes out of the etching solution to form a graphene fiber.

In accordance with an illustrative embodiment, the etching solution may include, but is not limited to, water, an etchant, and an organic solvent. In an illustrative embodiment, the etchant includes a compound selected from the group consisting of, but not limited to, ammonium persulfate [$(NH_4)_2S_2O_8$], an acid, buffered oxide etchant (BOE), iron (III) nitrate [$Fe(NO_3)_3$], iron(III) chloride ($FeCl_3$), copper (II) chloride ($CuCl_2$), and their combinations. In another illustrative embodiment, the acid may include an organic acid or an inorganic acid and may include a fluorine-containing acid, for example, but not limited to, HF. In an illustrative embodiment, the organic solvent may contain, but is not limited to, a hydrophilic group to be mixed with the water. In an illustrative embodiment, the organic solvent may be 20 vol % or more based on 100 vol % of a total solvent of the etching solution.

In still another illustrative embodiment, the graphene fiber is formed by, but not limited to, pulling the dispersed multiple linear graphenes out of the etching solution and simultaneously rotating and twisting the multiple linear graphenes.

In still another illustrative embodiment, the manufacturing method of the graphene fiber of the present disclosure may further include, but is not limited to, cooling the graphenes of linear pattern after forming the graphenes of linear pattern on the metal layer containing multiple linear patterns.

In still another illustrative embodiment, a thickness of the graphenes of linear pattern formed on the metal layer containing multiple linear patterns may be controlled by adjusting a time for the reaction, a thickness of the metal layer, a speed of the cooling process, and combinations thereof.

In still another illustrative embodiment, the metal layer includes at least one metal or alloy selected from the group consisting of, but not limited to, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

In still another illustrative embodiment, the line width of the metal layer containing the multiple linear patterns is, but not limited to, from about 1 nm to about 100 mm.

In still another illustrative embodiment, the diameter of the graphene fiber is controlled by, but not limited to, the line width of the metal layer containing the multiple linear patterns.

A graphene fiber in accordance with another aspect of the present disclosure is formed by connecting multiple linear graphenes manufactured by the above-described manufacturing method of a graphene fiber.

In an illustrative embodiment, the graphene fiber may be wound around a core including an insulating material, but the present disclosure is not limited thereto. The insulating material included in the core may be employed without limitation from those typically used in the art, for example, but not limited to, an insulating polymer. The core including the insulating material serves as a support for forming the graphene fiber. When the graphene fiber is wound around the core including the insulating material, a mechanical strength thereof can be improved as compared with the graphene fiber only.

A graphene electric wire in accordance with still another aspect of the present disclosure includes: the graphene fiber of an illustrative embodiment; and an insulator wrapping around the graphene fiber.

In an illustrative embodiment, the insulator is selected from the group consisting of, but not limited to, enamel, photoresist resin, poly(methylmethacrylate) (PMMA), polyethylene terephthalate (PET), poly vinyl alcohol (PVA), polyimide (PI), and their combinations.

In another illustrative embodiment, the graphene fiber may be wound around a core including an insulating material, but the present disclosure is not limited thereto. The graphene fiber and the graphene electric wire may contain all the technical matters described above in relation to the graphene fiber manufacturing method and overlapping explanations will be omitted for convenience.

A coaxial cable in accordance with still aspect of the present disclosure includes: a core conductor including a graphene; an insulator wrapping around the core conductor;

an external conductor wrapping around the insulator; and a jacket wrapping around the external conductor.

In an illustrative embodiment, the graphene may include, but is not limited to, the graphene fiber manufactured by the manufacturing method of a graphene fiber.

In another illustrative embodiment, the core conductor may include, but is not limited to, a metal member in which the graphene is formed on a surface of the metal member. In an illustrative embodiment, the metal member may include, but is not limited to, a metallic pipe or a metallic wire.

In still another illustrative embodiment, the graphene formed on the surface of the metal member is formed by, but not limited to, a chemical vapor deposition method.

In still another illustrative embodiment, the metal member is at least one metal or alloy selected from the group consisting of, but not limited to, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

In still another illustrative embodiment, the graphene is formed on the metal member by, but not limited to, a roll-to-roll process. In an illustrative embodiment, the roll-to-roll process may include, but is not limited to: introducing the metal member in a band-shape or line-shape from a first roller to a pretreating unit to treat the surface of the metal member by a roll-to-roll method; moving the metal member in a band-shape or line-shape passed through the pretreating unit to a synthesizing unit to synthesize a graphene on the metal member and simultaneously to coat the metal member with the graphene; and winding the metal member in a band-shape or the line-shape passed through the synthesizing unit around a second roller by a roll-to-roll method for collection.

The coaxial cable may contain all the technical matters described above in relation to the graphene fiber manufacturing method and overlapping explanations will be omitted for convenience.

Hereinafter, a manufacturing method of a graphene fiber, a graphene fiber manufactured by the same method, and a coaxial cable including the graphene fiber will be explained in detail with reference to the accompanying drawings. However, the present disclosure is not limited thereto.

Figure 1:
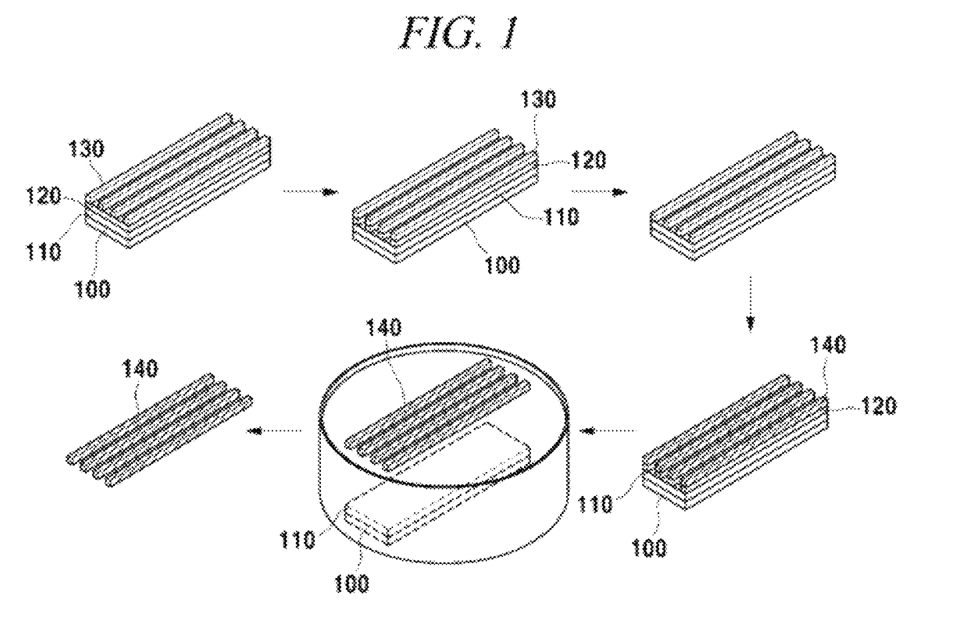
FIG. 1 is a flow chart schematically showing a process of forming a linear graphene in accordance with an illustrative embodiment of the present disclosure.

FIG. 1 shows a process of forming a graphene 140 of linear pattern on a metal layer 120 by a chemical vapor deposition method.

A metal layer is formed on a substrate 100. Herein, the substrate 100 may include, but is not limited to, a glass substrate, a plastic substrate or a silicon substrate. Any substrate may be used if it can be coated with a metal layer or graphene by the chemical vapor deposition method. If necessary, an insulating layer 110 may be added onto a surface of the substrate in order to easily perform a coating process of the metal layer 120. The insulating layer 110 may be formed by coating a typical insulating material. By way of example, if the substrate 100 is a silicon substrate, the insulating layer 110 may be a silicon oxide ($SiO_2$) layer.

A method of forming the metal layer 120 on the substrate 100 or the insulating layer 110 may be employed without limitation from those typically used in the art as a method of forming a metal layer. By way of example, the metal layer 120 may be formed by using a thermal evaporator, an e-beam evaporator, a sputtering method or an electro-plating method. The metal layer 120 includes at least one metal or alloy selected from the group consisting of, but not limited to, Ni, Co, Fe, Pt, Au, Al, Cr, Cu, Mg, Mn, Mo, Rh, Si, Ta, Ti, W, U, V, Zr, brass, bronze, white brass, stainless steel, and Ge.

Then, a graphene of linear pattern is formed on the metal layer. The graphene of linear pattern may be formed on the metal layer by pattering the metal layer in a linear form and growing the graphene on the metal layer of linear pattern or by growing the graphene on the metal layer and patterning the graphene in a linear form.

Hereinafter, there will be explained a method of pattering the metal layer in a linear form and growing the graphene on the metal layer of linear pattern as depicted in FIG. 1, but the present disclosure is not limited thereto. The graphene may be grown first on the metal layer and the grown graphene may be patterned so as to form the above-described linear graphenes.

A method of patterning the metal layer in a linear form may be employed from various methods publicly known in the art. By way of example, typical photolithography or e-beam lithography may be employed. In a non-limiting illustrative embodiment of forming the metal layer of linear pattern, a patterned photoresist layer 130 is formed on the metal layer 120 and the metal layer is patterned by a photoresist process. Then, the patterned photoresist layer is removed by an etching process. In this way, the metal layer 120 can include multiple linear patterns. After the patterning process, a process of removing an oxide layer and impurities from the patterned metal layer maybe additionally performed. In this process, the metal layer 120 including the multiple linear patterns is put into a reactor and heated therein with a flowing hydrogen gas.

Thereafter, the graphenes 140 are grown on the metal layer 120 including the multiple linear patterns. A method of growing a graphene on a substrate may be employed without limitation from those used in the art as a method of growing a graphene. By way of example, the method may include, but is not limited to, a rapid thermal chemical vapor Deposition (RTCVD) method, an inductively coupled plasma-chemical vapor deposition (ICP-CVD) method, a low pressure chemical vapor deposition (LPCVD) method, an atmospheric pressure chemical vapor deposition (APCVD) method, a metal organic chemical vapor deposition (MOCVD) method, or a plasma-enhanced chemical vapor deposition (PECVD) method.

A process of growing the graphene can be carried out at an atmospheric pressure or a low pressure or in a vacuum. By way of example, if the process is carried out at an atmospheric pressure, helium (He) is used as a carrier gas to minimize damage to the graphene caused by a collision with heavy argon (Ar) at a high temperature. Further, if the process is carried out at an atmospheric pressure, a large scale graphene can be manufactured by a simple process at low cost. Furthermore, if the process is carried out at a low pressure or in a vacuum, hydrogen ($H_2$) is used as an atmospheric gas and if the process is performed while increasing a temperature, an oxidized surface of a metallic catalyst is reduced, so that a high quality graphene can be manufactured.

The process of growing the graphene includes a process of cooling the grown graphene. The cooling process includes a process of cooling the graphene by using a separate cooling device and a process of cooling the graphene at room temperature. Through the cooling process, a sufficient amount of carbon absorbed onto the metal layer 120 in a linear form is separated from the metal layer 120 and crystallized on a surface of the metal layer 120. Depending on the amount of carbon, a thickness of the graphenes 140 of linear pattern may vary. The thickness of the graphene 140 of linear pattern can be adjusted by varying a reaction time, a thickness of the metal layer, a speed of the cooling process.

Then, the substrate is immersed in an etching solution to selectively remove the metal layer 120 for separating the graphenes 140 of linear pattern from the substrate and dispersing multiple linear graphenes 140 into the etching solution. The etching solution may be employed without limitation from those typically used in the art as a solution capable of selectively removing the metal layer or separating the metal layer from the graphenes. As a non-limiting example, the etching solution may include an organic solvent and an aqueous solution containing a compound selected from the group consisting of various acids, ammonium persulfate [$(NH_4)_2S_2O_8$], BOE, $Fe(NO_3)_3$, iron(III) chloride ($FeCl_3$), $CuCl_2$, and their combinations.

The amount of the organic solvent in the etching solution may be controlled to adjust hydrophobicity of the etching solution. If normal water is used as a solvent of the etching solution, the graphenes come up to the surface of the etching solution due to hydrophobicity thereof and a film structure is predominant over a fiber structure in the graphenes. However, when the organic solvent, such as alcohol, acetone, and the likes, capable of being mixed with water is added to the etching solution, the hydrophobicity of the etching solution can be increased and the formed graphenes do not come up to the surface of the etching solution but can be dispersed in a fiber form in the etching solution. By way of example, if the organic solvent about vol % or more is present in the etching solution, the multiple linear graphenes do not come up to the surface but can be dispersed in the etching solution. In an illustrative embodiment, the etching solution may include, but is not limited to, an etching solution containing 0.5 M $FeCl_3$ aqueous solution and ethyl alcohol at a mixing ratio of about 1:1.

Figure 2:
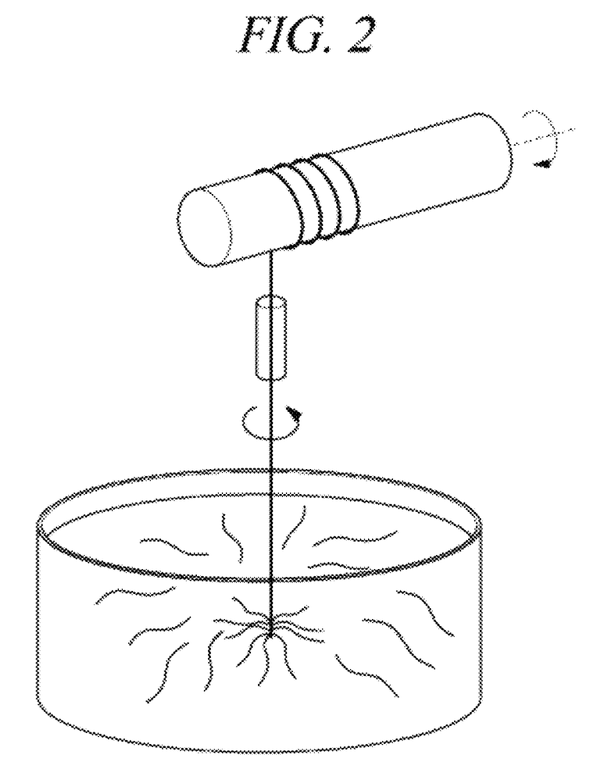
FIG. 2 is a schematic view showing a continuous graphene fiber manufacturing apparatus in accordance with an illustrative embodiment of the present disclosure.
Figure 3:
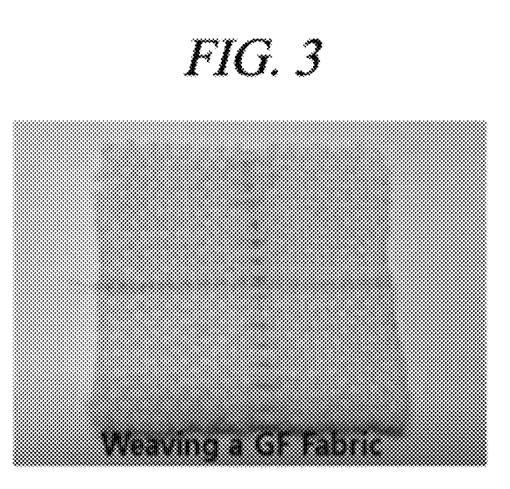
FIG. 3 is a photo showing fiber weaved by using a graphene fiber manufactured in accordance with an example of the present disclosure.

The multiple linear graphenes 140 separated from the linear metal layer 120 by the etching process and dispersed in the etching solution are self-assembled in a fiber form at an interface of the etching solution. To be more specific, if a part of the multiple linear graphenes 140 dispersed in the etching solution is pulled out of the etching solution, the multiple linear graphenes 140 are changed into a fine thread due to surface tension of the etching solution and hydrophobicity of the graphenes. In this way, a graphene fiber can be obtained. This process of forming the graphene fiber can be continuously performed by using an apparatus depicted in FIG. 2. A diameter of the graphene fiber can be changed depending on a line width of the patterned linear graphenes. Referring to FIG. 2, the graphene fiber can be weaved by pulling the dispersed multiple linear graphenes out of the etching solution and rotating and twisting them at the same time. During this process, a motor may be used. FIG. 3 shows fiber weaved by using a graphene fiber manufactured in accordance with an example of the present disclosure.

Figure 4:
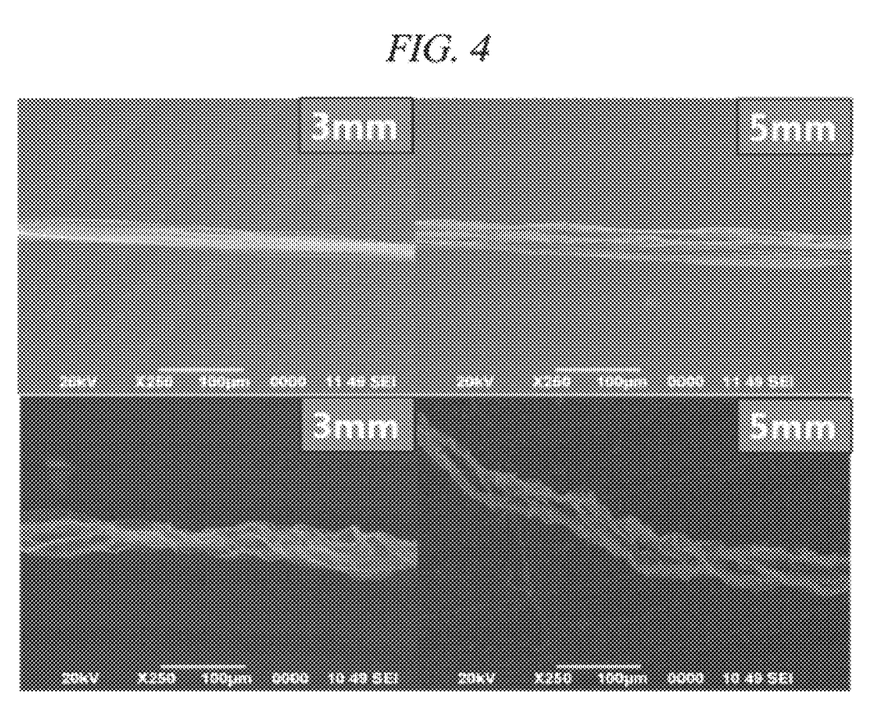
FIG. 4 is an electron micrograph of a graphene fiber in accordance with an example of the present disclosure.
Figure 5:
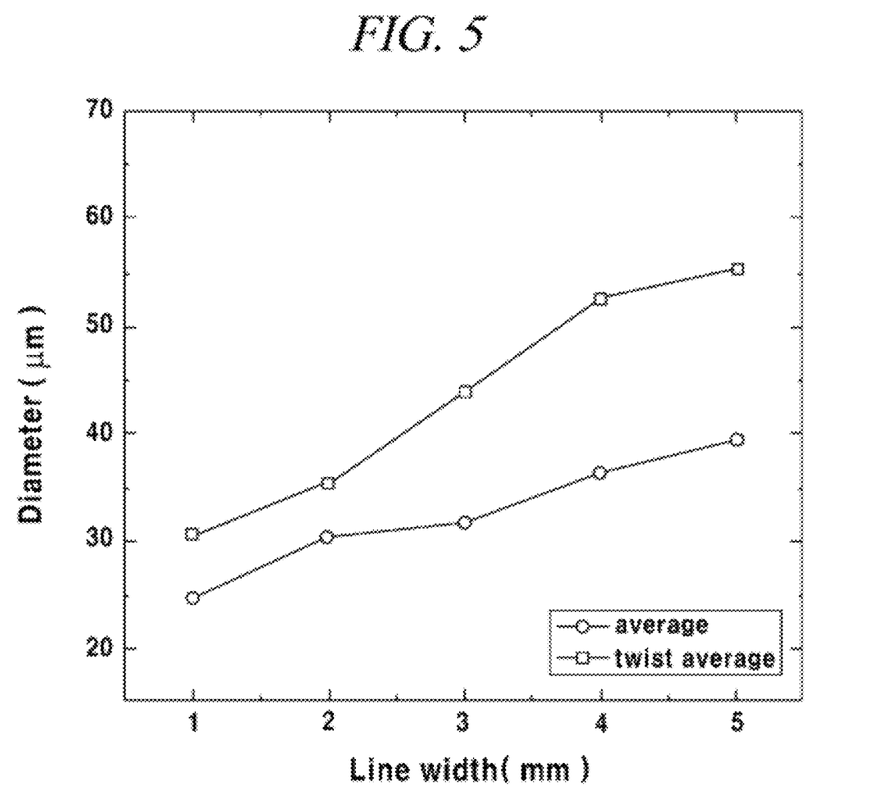
FIG. 5 is a graph showing a diameter of a graphene fiber depending on a line width of a linear graphene in accordance with an example of the present disclosure.

FIGS. 4 and 5 provide an electron micrograph (FIG. 4) showing a cross section of a graphene fiber manufactured by various methods in accordance with an example of the present disclosure and a graph (FIG. 5) showing a diameter of a graphene fiber depending on a line width of a linear graphene. To be specific, the upper photo of FIG. 4 shows a graphene fiber (linear graphenes having line widths of about 3 mm and about 5 mm, respectively) manufactured by pulling the multiple linear graphenes out of the etching solution without rotating and twisting the multiple linear graphenes, and the lower photo shows a graphene fiber (linear graphenes having line widths of about 3 mm and about 5 mm, respectively) manufactured by pulling the multiple linear graphenes out of the etching solution and rotating and twisting them at the same time by using a motor as depicted in FIG. 2. It can be seen from FIG. 5 that a diameter of the graphene fiber (the lower photo of FIG. 4) manufactured by pulling the multiple linear graphenes out of the etching solution and rotating and twisting them at the same time is greater than a diameter of the graphene fiber (the upper photo of FIG. 4) manufactured without rotating and twisting the multiple linear graphenes.

The graphene fiber itself can be used as an electric wire, but the graphene wire coated with an insulator may be used for an electric device in practice. In this case, the insulator may be selected from the group consisting of, but not limited to, enamel, photoresist resin, polyolefin, phenolic resin, PMMA, PET, PVA, PI, and their combinations.

Figure 6:
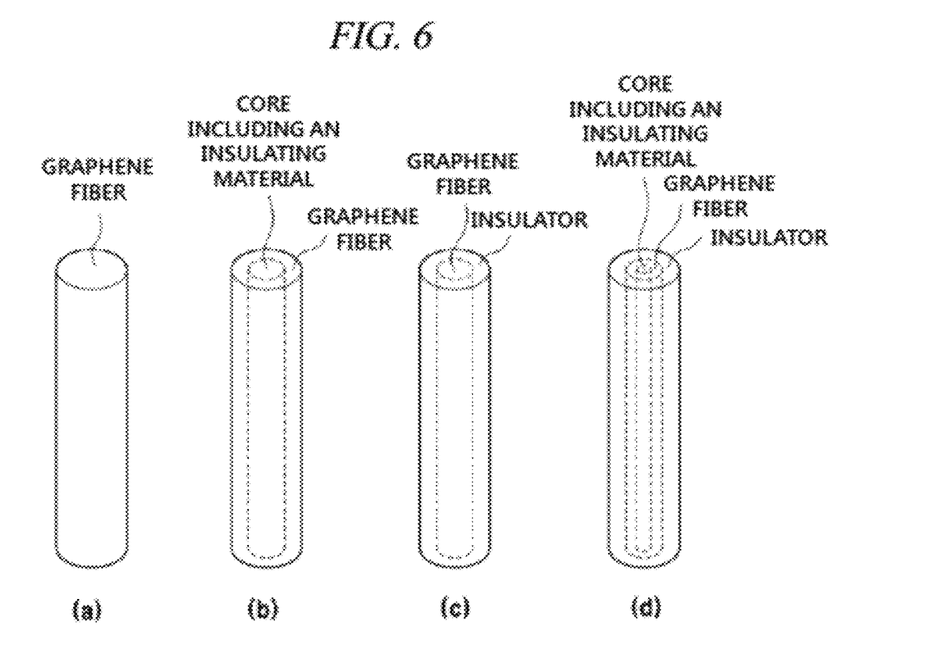
FIG. 6 is a schematic view showing various types of a graphene fiber and a graphene electric wire in accordance with an illustrative embodiment of the present disclosure.

FIG. 6 shows various types of a graphene fiber and a graphene electric wire manufactured by the above-described methods. As depicted in FIG. 6, the graphene fiber may be present by itself (FIG. 6a) or the graphene fiber may be wound around a core including an insulating material (FIG. 6b). Further, the graphene electric wire may include only the graphene fiber and an insulator wrapping around the graphene fiber as depicted in FIG. 6c or the graphene electric wire may include the graphene fiber wound around a core including an insulating material as depicted in FIG. 6d.

Figure 7:
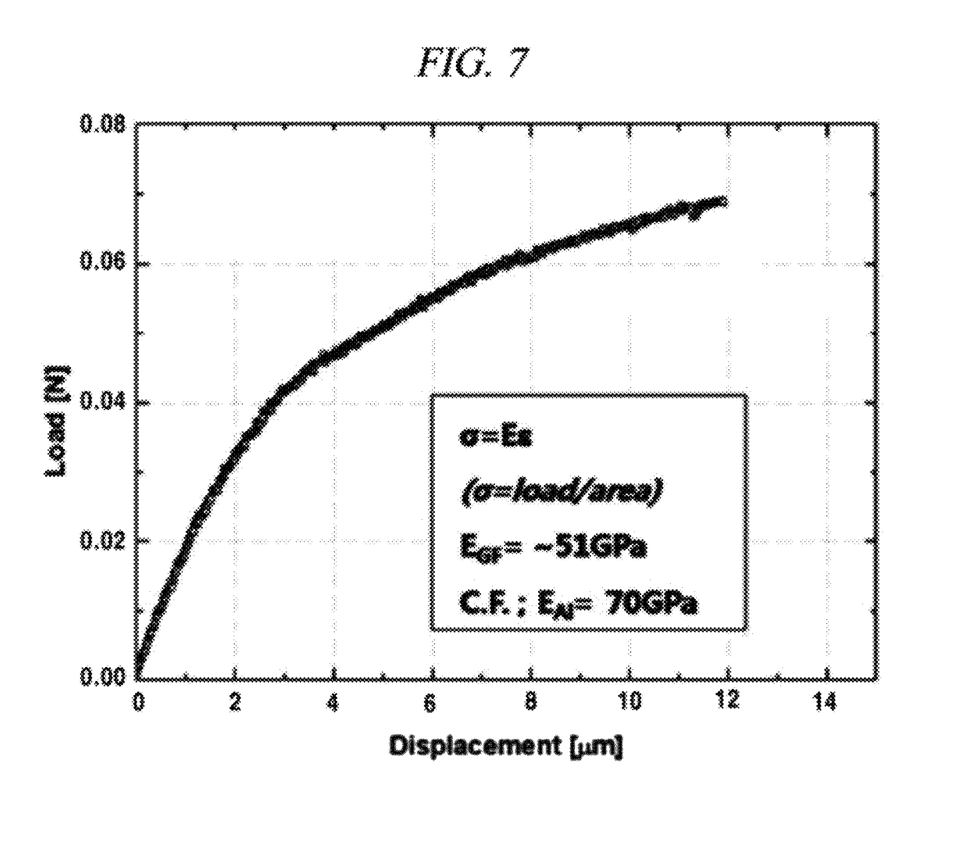
FIG. 7 is a graph showing a mechanical strength of a graphene fiber in accordance with an example of the present disclosure.

The graphene electric wire including the graphene fiber and the insulator has conductivity per unit weight three times or more higher than a conventional metallic wire and is very flexible and light as compared with the metallic wire. Therefore, the graphene electric wire can be applied to various fields including a mobile power unit requiring a lightweight electric wire. By way of example, FIG. 7 is a graph showing a mechanical strength of a graphene electric wire in accordance with an example, and referring to FIG. 7, the graphene electric wire has a mechanical strength of about 51 GPa as compared with an aluminum electric wire of about 70 GPa. As for a metallic wire mainly containing copper, its resistivity increases as a frequency increases due to a phenomenon called "skin effect", and, thus, signal transmission efficiency is decreased. Unlike this metallic wire, the graphene fiber and the graphene electric wire do not decrease signal transmission efficiency at high frequency. Further, high electrical conductivity of the graphene causes high thermal conductivity, and, thus, the graphene has an improved thermal emission property. Therefore, it is possible to maximize electric power transmission efficiency and an electric power transmission capacity by minimizing power loss caused by heat generation.

The following Table 1 shows a result of a comparison of electric conductivity in a graphene electric wire and an electric wire made of other materials.

TABLE 1

| | Resistivity (Ohm*m) | Conductivity (S/m) | Density (g/cc) | Conductivity/Density |
|---|---|---|---|---|
| Silver | $1.590 \times 10^{-8}$ | $6.29 \times 10^{7}$ | 10.5 | $5.99 \times 10^{6}$ |
| Copper | $1.720 \times 10^{-8}$ | $5.81 \times 10^{7}$ | 9 | $6.46 \times 10^{6}$ |
| Gold | $2.440 \times 10^{-8}$ | $4.10 \times 10^{7}$ | 19.3 | $2.12 \times 10^{6}$ |
| Aluminum | $2.820 \times 10^{-8}$ | $3.55 \times 10^{7}$ | 2.7 | $1.31 \times 10^{6}$ |
| CNT fiber | $3.333 \times 10^{-8}$ | $3.00 \times 10^{7}$ | 2.0 | $1.50 \times 10^{6}$ |
| Graphene | $5.800 \times 10^{-8}$ | $1.72 \times 10^{7}$ | 2.1 | $8.21 \times 10^{6}$ |

Figure 8:
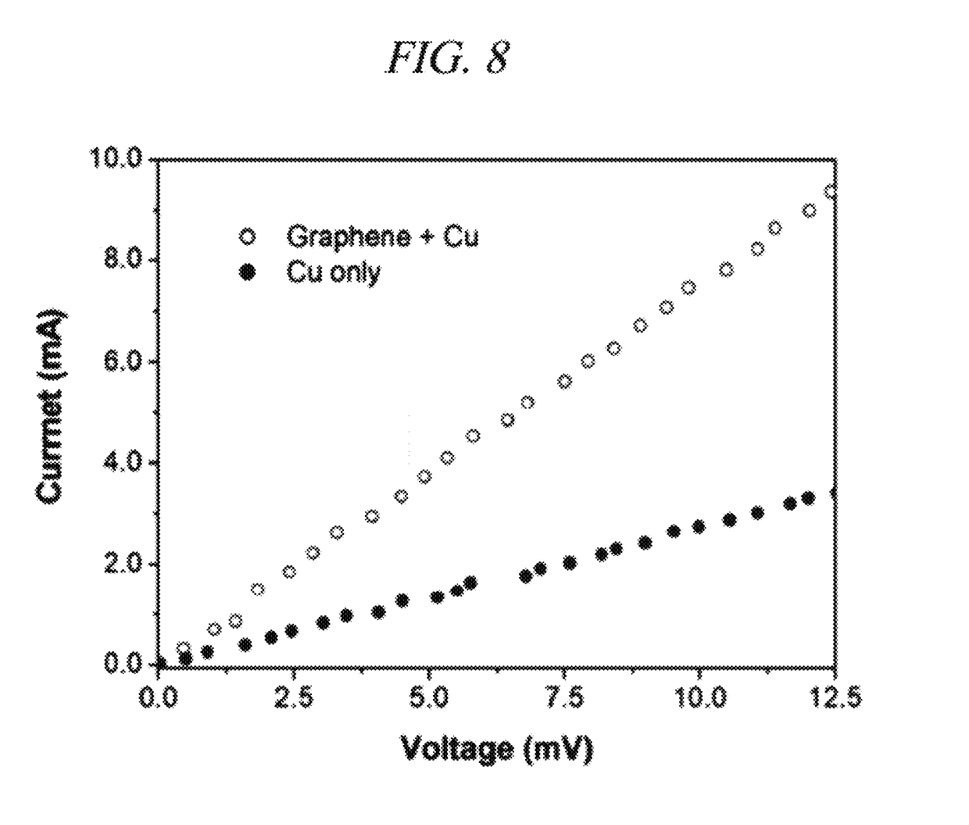
FIG. 8 is a graph showing a result of a comparison of electric conductivity in a copper electric wire and a copper/graphene electric wire in accordance with an example of the present disclosure.

To be more specific, it can be seen from Table 1 that the graphene electric wire has higher electric conductivity as compared with a silver or copper electric wire considering density. By way of example, as a result of analyzing electrical and mechanical properties of a graphene fiber, a mechanical strength of the graphene fiber is similar to that of aluminum and conductivity of the graphene fiber is higher than that of silver considering density (see FIG. 6 and Table 1). Such properties can be further improved by optimizing a future synthesis process. By way of example, the electrical/mechanical properties can be improved by forming a composite with a conductive polymer or an organic/inorganic compound, or the conductivity can be increased by a chemical doping process. By way of example, FIG. 8 is a result of a comparison of electric conductivity in a copper electric wire made of copper only and a copper/graphene composite electric wire. As depicted in FIG. 8, the copper/graphene composite electric wire has electrical conductivity three times or more higher than the copper electric wire made of copper only.

A coaxial cable in accordance with the present disclosure includes: a core conductor including a graphene; an insulator wrapping around the core conductor; an external conductor wrapping around the insulator; and a jacket wrapping around the external conductor. Herein, the graphene may be formed of, but not limited to, only a graphene fiber manufactured by the above-described method.

The core conductor may be formed of, but not limited to, only the graphene or the graphene with an insulator formed on the graphene. By way of example, the core conductor may be manufactured by forming the graphene directly on the surface of the metal member. If a coaxial cable is manufacture by forming a graphene directly on a surface of a metal member, the graphene can serve as an oxidation prevention film of the metal member, and, thus, an interconnect contact and a life span of the coaxial cable can be highly increased and another process such as an etching process is not needed. A shape of the metal member may be employed without limitation from those typically used in the art for manufacturing a core of a coaxial cable. The shape of the metal member may include, but is not limited to, a metallic pipe or a metallic wire.

A chemical vapor deposition method may be employed as a method for forming the graphene on the metal member. In a non-limiting example of forming the graphene by using the chemical vapor deposition method, a carrier gas is supplied with a carbon source and heat to make a reaction on a metallic wire as a catalytic substrate and the metallic wire is cooled to form the graphene on the surface of the metallic wire. Herein, the metallic wire may include at least one metal or alloy selected from the group consisting of, but not limited to, Ni, Co, Fe, Pt, Au, Al, Cr, Cu, Mg, Mn, Mo, Rh, Si, Ta, Ti, W, U, V, Zr, brass, bronze, white brass, stainless steel, and Ge. The coaxial cable containing a graphene-metal composite as the core conductor has higher conductivity than the coaxial cable containing only the graphene as the core conductor. This can be seen from the above-described graph of FIG. 8.

Figure 9:
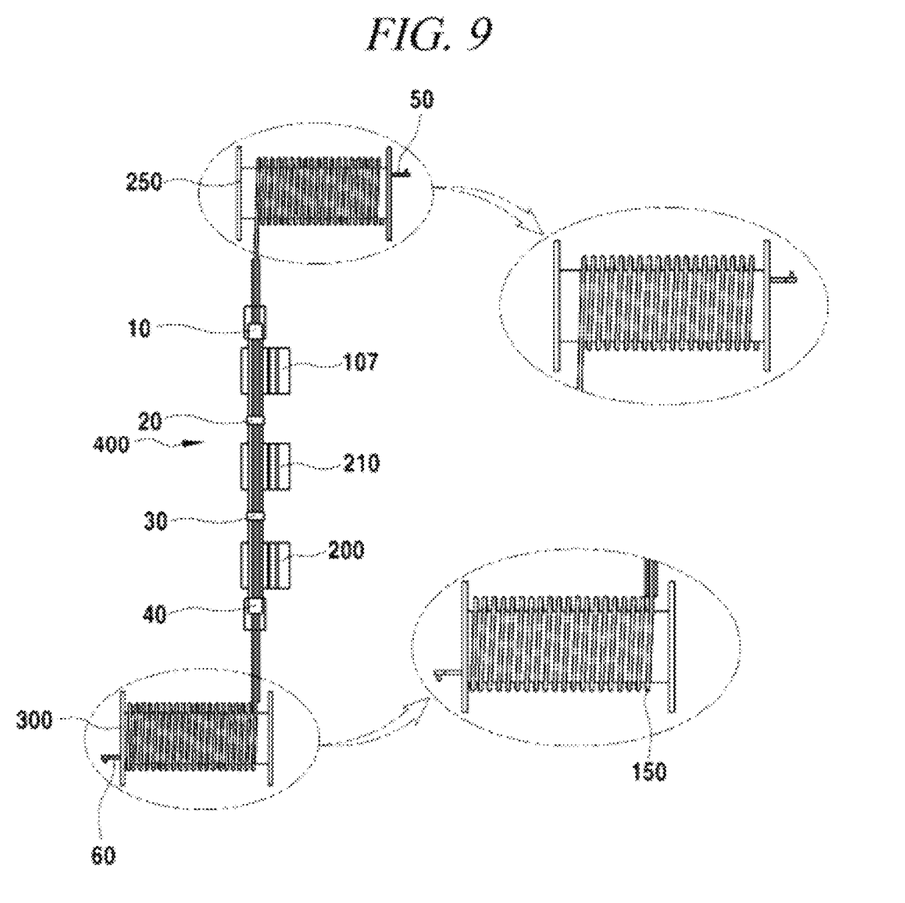
FIG. 9 is a conceptual diagram of a graphene roll-to-roll coating apparatus in accordance with an illustrative embodiment of the present disclosure.

FIG. 9 is a conceptual diagram of a graphene roll-to-roll coating apparatus for forming a graphene directly on a metal member. In case of using the graphene roll-to-roll coating apparatus, a large amount of high quality graphene can be coated on a surface of the metal member at low cost by continuously performing chemical vapor deposition at an atmospheric pressure or a low pressure. In case of forming the graphene on the metal member by using the graphene roll-to-roll coating apparatus, the metal member may be formed in, but not limited to, a band-shape or a line-shape.

The graphene roll-to-roll coating apparatus may include: a first roller 250 configured to supply a metallic band or a metallic line by a roll-to-roll method; a pretreating unit 400 configured to treat a surface of the metal member supplied from the first roller; a graphene synthesizing unit 500 configured to synthesize a graphene on the metal member and simultaneously to coat the metal member with the graphene; and a second roller 300 configured to collect the metal member coated with the graphene passed through the graphene synthesizing unit 500 by the roll-to-roll method. Further, the roll-to-roll coating apparatus may include a roller including a gas introduction unit configured to stably supply a gas regardless of a moving direction of the rollers wound with the metallic line.

The graphene may be synthesized and coated by introducing a reaction gas containing a carbon source through a gas nozzle 510 of the graphene synthesizing unit 500 and performing chemical vapor deposition on a surface of the metallic line or the metallic band in the graphene synthesizing unit 500. In order to prevent the metal member from being severely deformed at a high temperature, if necessary, the roll-to-roll coating apparatus may be provided vertically or horizontally, so that deflection can be decreased and a thermal gradient of the metal member can be stably maintained.

The coaxial cable including the core conductor manufactured by the above-described method has the same electrical property as the above-described graphene electric wire. That is, the coaxial cable has excellent chemical-resistant and corrosion-resistant properties, improved electrical resistance, high signal transmission efficiency at a high frequency, and improved heat generation (heat emission) efficiency.

Hereinafter, an example of the present disclosure will explained in detail, but the present disclosure is not limited thereto.

Example 1

1. Growth of Large Scale Graphene on Nickel (Ni) Thin Film

A $SiO_2$ insulating layer was formed on a silicon substrate and a nickel thin film was deposited on the insulating layer. The nickel thin film was patterned to have multiple linear patterns by a lithography process using photoresist. The linear patterns had line widths of about 1 mm, about 2 mm, about 3 mm, about 4 mm, and about 5 mm, respectively. Then, the substrate on which the nickel thin film was formed was put into a reaction chamber and heated therein at about 1000° C. while $H_2$ of about 10 sccm was introduced thereto at about 180 mTorr. After a temperature of the substrate reached about 1000° C., the substrate was annealed for about 30 minutes while maintaining the flow rate and the pressure of the hydrogen. Thereafter, a gas mixture ($CH_4$: $H_2$=30:10 sccm) containing a carbon source was supplied for about 15 minutes at about 1.6 Torr to grow a graphene on the nickel thin film of linear patterns. Then, while $H_2$ was introduced at about 180 mTorr, the graphene was cooled in a short time to a room temperature at a speed of about −10° C./s. Thus, the graphene of linear patterns grown on the nickel thin film of linear patterns was obtained.

2. Preparation of Graphene Fiber

The substrate on which the graphene of linear patterns was formed in accordance with the above-described process was immersed in an etching solution containing 0.5 M $FeCl_3$ aqueous solution and ethyl alcohol at a mixing ratio of about 1:1 and the nickel thin film was selectively removed. Thus, multiple linear graphenes were dispersed in the etching solution. Then, a part of the linear graphenes was pulled out of the etching solution by using tweezers to manufacture a graphene fiber (see FIGS. 2 and 3).

FIG. 4 shows an electron micrograph of the graphene fiber in a fiber form manufactured in accordance with the present example.

The present disclosure has been explained in detail with reference to the example as above, but the present disclosure is not limited to the above-described example and can be modified and changed in various ways. Thus, it is clear that various changes and modifications may be made by those skilled in the art within the scope of the inventive concept.

What is claimed is:

1. A manufacturing method of a graphene fiber, comprising:
   forming a metal layer containing multiple linear patterns on a substrate;
   supplying a reaction gas containing a carbon source and heat to the metal layer containing multiple linear patterns to form multiple linear graphene sheets;
   immersing the substrate in an etching solution to selectively remove the metal layer from the substrate and disperse the multiple linear graphene sheets into the etching solution; and
   pulling the dispersed multiple linear graphene sheets out of the etching solution to form a graphene fiber,
   wherein each of the pulled multiple linear graphene sheets has a width from approximately 1 mm to approximately 5 mm, and the formed graphene fiber has a diameter from approximately 25 μm to approximately 55 μm.

2. The manufacturing method of a graphene fiber of claim 1, wherein the etching solution includes water, an etchant, and an organic solvent.

3. The manufacturing method of a graphene fiber of claim 2, wherein the etchant includes a compound selected from the group consisting of ammonium persulfate $(NH_4)_2S_2O_8$, an acid, buffered oxide etchant (BOE), iron (III) nitrate $Fe(NO_3)_3$, iron(III) chloride $FeCl_3$, copper(II) chloride $CuCl_2$, and their combinations.

4. The manufacturing method of a graphene fiber of claim 2, wherein the organic solvent contains a hydrophilic group to be mixed with the water.

5. The manufacturing method of a graphene fiber of claim 1, wherein the graphene fiber is formed by pulling the dispersed multiple linear graphene sheets out of the etching solution and simultaneously rotating and twisting the multiple linear graphene sheets.

6. The manufacturing method of a graphene fiber of claim 1, wherein the metal layer includes at least one metal or alloy selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge.

7. The manufacturing method of a graphene fiber of claim 1, wherein a line width of the metal layer containing the multiple linear patterns is from about 1 nm to about 100 mm.

8. The manufacturing method of a graphene fiber of claim 1, wherein a diameter of the graphene fiber is controlled by the line width of the metal layer containing the multiple linear patterns.

9. A graphene fiber, comprising:
   a plurality of linear graphene sheets pulled out of an etching solution and self-assembled to form an elongated thread having a length which is longer than a length of each of the plurality of linear graphene sheets;
   wherein each of the plurality of linear graphene sheets has a width from approximately 1 mm to approximately 5 mm, and the elongated thread has a diameter from approximately 25 μm to approximately 55 μm.

10. The graphene fiber of claim 9, wherein the graphene fiber is wound around a core including an insulating material.

11. A graphene electric wire, comprising:
    a graphene fiber of claim 9, and an insulator wrapped around the graphene fiber.

12. The graphene electric wire of claim 11, wherein the graphene fiber is wound around a core including an insulating material.

13. The graphene electric wire of claim 11, wherein the insulator is selected from the group consisting of enamel, photoresist polyethylene resin, poly (methylmethacrylate) (PMMA), terephthalate(PET), poly vinyl alcohol(PVA), polyimide(PI), and their combinations.

14. A coaxial cable, comprising:
    a core conductor including a graphene fiber;
    an insulator wrapped around the core conductor;
    an external conductor wrapped around the insulator; and
    a jacket wrapped around the external conductor,
    wherein the graphene fiber includes a plurality of linear graphene sheets pulled out of an etching solution and self-assembled to form an elongated thread; and
    each of the plurality of linear graphene sheets has a width from approximately 1 mm to approximately 5 mm, and the elongated thread has a diameter from approximately 25 μm to approximately 55 μm.

15. The coaxial cable of claim 14, wherein the core conductor includes a metal member on which the graphene fiber is formed on a surface of the metal member.

16. The coaxial cable of claim 15, wherein the metal member includes a metallic pipe or a metallic wire.

17. The coaxial cable of claim 15, wherein a metal forming the metal member is at least one metal or alloy selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge.

18. The coaxial cable of claim 15, wherein the graphene fiber is formed on the metal member by a roll-to-roll process.

19. The coaxial cable of claim 18, wherein the roll-to-roll process includes:
    introducing the metal member in a band-shape or line shape from a first roller to a pretreating unit to treat the surface of the metal member by a roll-to-roll method;
    moving the metal member in a band-shape or line-shape passed through the pretreating unit to a synthesizing unit to synthesize a graphene on the metal member and simultaneously to coat the metal member with the graphene; and
    winding the metal member in a band-shape or the line-shape passed through the synthesizing unit around a second roller by a roll-to-roll method for collection.

* * * * *